Aug. 12, 1952 — C. L. DEELY — 2,606,620
FISHING TOOL
Filed Nov. 14, 1947

INVENTOR.
*Carroll L. Deely*
BY *Wayland D. Keith*
HIS AGENT

Patented Aug. 12, 1952

2,606,620

UNITED STATES PATENT OFFICE 2,606,620

FISHING TOOL

Carroll L. Deely, Dallas, Tex.

Application November 14, 1947, Serial No. 786,057

2 Claims. (Cl. 166—19)

This invention relates to improvements in fishing tools, of the character adapted to remove lost objects from the bottom of a deep well, such as an oil well.

Most fishing tools employed heretofore for this purpose have been of the grapple type adapted to engage articles dropped into the well, such as bits, cones, pieces of pipe, etc., but difficulties are encountered, especially with small objects such as drill cones, bolts, etc., in engaging such small objects due to the embedding thereof in the mud at the bottom of the hole. Such fishing tools as have been proposed for accomplishing a fishing action by washing the objects out of the bottom of the hole have not been entirely satisfactory nor effective in removing the articles therefrom.

An object of this invention is to improve the construction of such fishing tools, to enable the recovery of the lost objects to be accomplished by a washing action of the drilling fluid and a collection of the lost objects in a chamber or receptacle, which will enable them to be withdrawn from the well. This washing action is accomplished in a reverse direction of circulation in the tool, whereby the fluid is forced outwardly at the bottom of the well and then into the center thereof, causing the objects to be flushed or washed into the central chamber or receptacle of the fishing tool.

A further object of the invention is to improve the construction of the fishing tool to insure of the collection therein, not only of heavy objects which may be collected from the bottom of the hole, but also small objects including bolts and the like, and to insure that these will be trapped in the tool for removal from the well.

These objects may be accomplished according to a preferred embodiment of the invention by providing a bell-shaped tool or body which has a trap chamber or receptacle therein for the collection of the objects from the botom of the well with means for circulating fluid down inside the tool around the outside of the chamber and directing the fluid into the chamber to wash the objects from the well into the chamber. Provision is made in the receptacle or chamber for the collection of the objects, trapping them therein to insure their removal from the well.

This embodiment of the invention is illustrated in the accompanying drawings, in which.

The invention is shown as applied for the recovery of objects from the bottom of a deep well, such as an oil well, as designated generally at W, which is formed as a bore hole in the earth, although it will be appreciated that it may be used in other wells or holes where it may be desired to remove objects therefrom.

Centrally disposed within the well W is a drill stem designated generally by the numeral 1, to the lower end of which is connected a head 2 through a joint 3. The drill stem 1 and head 2 having axial openings formed therein for the circulation of fluid therethrough as is customary in the drilling of wells by the rotary method.

Figure 1:
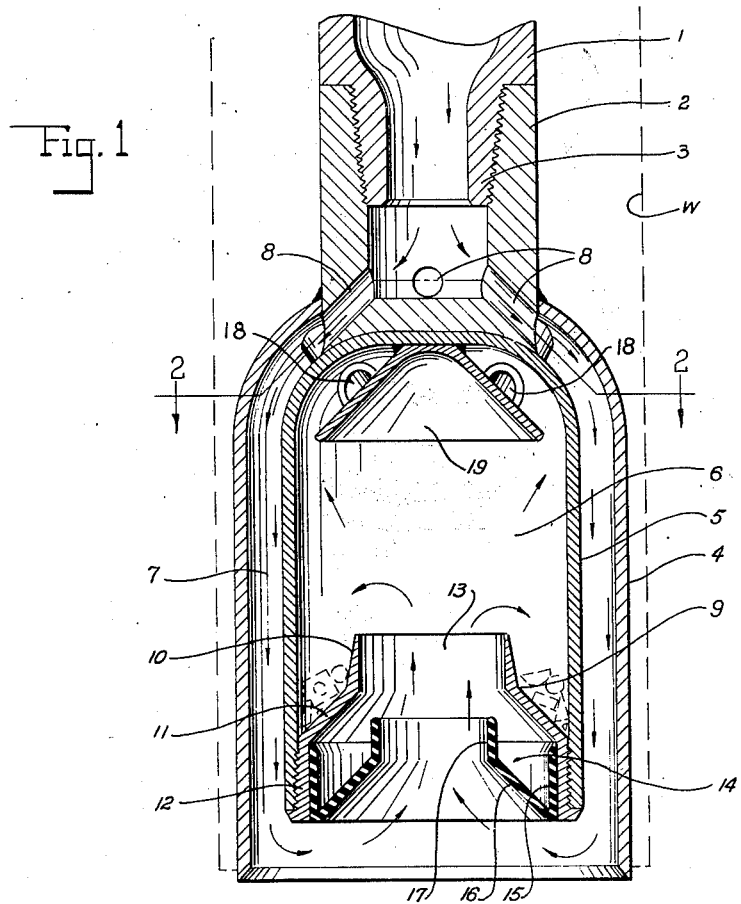
Fig. 1 is a vertical sectional view through a fishing tool mounted in the bottom of a well.

Secured to the lower end of the head 2 is a bell-shaped body 4 having a lower open end adapted to engage the bottom of the well W as shown in Fig. 1, so as to seal off the space around the body 4. Also secured to the head 2 and extending downwardly therefrom is a bell-shaped body or receptacle 5 having an open interior or chamber 6 therein adapted to receive objects therein. The receptacle 5 is spaced at its periphery from the inner wall of the body 4, with an annular passageway 7 therebetween, connected through lateral passages 8 at the top thereof with the central passageway through the drill stem 1 and the head 2, which openings 8 are formed in the head 2. The lower end of the receptacle 5 terminates at a point appreciably above the lower end of the body 4 to form a passage for the circulation of fluid from the annular passage 7 into the chamber 6 at the center of the receptacle 5.

Mounted within the lower end of the receptacle 5 is a catcher member 9 which has a lip portion 10 on the upper end thereof and a depending frusto-conical portion 11 below the annular lip portion 10, which frusto-conical portion 11 is supported by a sleeve portion 12 having screw-threaded engagement or otherwise secured to the lower inner end of the receptacle 5. The catcher 9 is adapted to receive the material collected from the well through the axial opening 13 thereof and to trap this material in the chamber 6. The catcher 9 preferably is formed of metal or other rigid material, such as steel, which will securely hold any articles that may be forced into the chamber 6.

Also mounted in the lower end of the receptacle 5 is a trap member 14. This trap member 14 preferably is formed of soft rubber or other soft yieldable and resilient material and is of a size and shape to yield to the admission of such trapped articles as may be forced into the chamber 6, and yet to prevent small articles from dropping back into the hole. The trap 14 is provided with a peripheral sleeve portion 15 secured to the inner wall of the sleeve 12 or the bottom of the receptacle 5, and from which sleeve portion 15 a frusto-conical portion 16 extends upwardly to a constricted annular lip 17 which has an inner diameter forming an axial opening therethrough, which is appreciably smaller than the opening 13 through the catcher 9.

Figure 2:
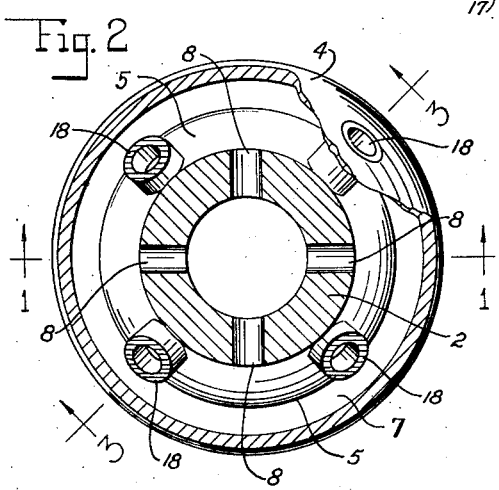
Fig. 2 is a cross section therethrough on the line 2—2 in Fig. 1.
Figure 3:
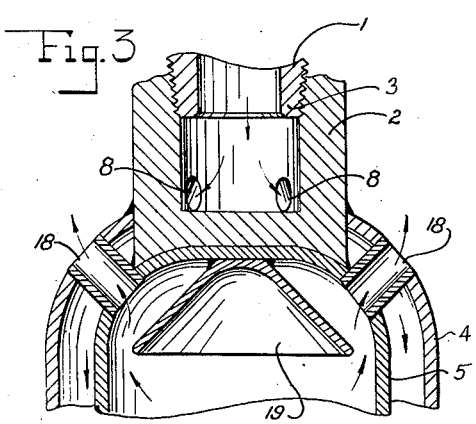
Fig. 3 is a vertical section therethrough on the line 3—3 in Fig. 2.

At the top of the chamber 6 are formed outlet conduits 18, as shown in Figs. 2 and 3, extending laterally from the chamber 6 to a point externally of the body 4 for discharging the fluid from within the chamber into the bore of the well externally of the tool. A cap deflector 19 is secured in the top of the receptacle 5 and preferably is of conical shape. The periphery of the deflector 19 is spaced inwardly from the inner wall of the receptacle 5 to permit freedom of circulation of the fluid therebetween to the ports 18, and is spaced also from the inner ends of the ports for circulation therebetween. The deflector 19, nevertheless, extends as a cover over the ports to prevent the plugging of the ports by small objects that may be washed into the chamber 6 during the fishing operation.

The use of the tool will be evident from the foregoing description. It is lowered into the bottom of the well W by the drill stem 1, and preferably is dropped until the bottom edge of the body 4 engages directly in the beveled bottom of the well, as illustrated in Fig. 1, in such relation as to form a seal to prevent the circulation of drilling fluid around the lower edge of the body 4. Drilling fluid is forced downwardly through the central opening of the drill stem 1 in the customary manner of operating rotary drilling apparatus but without rotation of the drill stem, which drilling fluid is forced through the central opening of the head 2, thence through the openings 8 into the annular passageway 7.

This drilling fluid follows the path indicated by the arrows in Fig. 1, being directed into the center of the well bore at the bottom thereof since the lower edge of the body 4 is sealed off. Thus the action of the drilling fluid is reversed at the bottom of the well, it being forced from the drill stem 1 in a direction first outwardly into annular passage 7 and thence downward to the bottom of the bell-shaped receptacle 5, the lower end of which is spaced upward above the lower end of body 4 so as to define an area on the bottom of the well over which drilling fluid will be directed under high pressure at a high velocity into the chamber 6. The action thereof will cause any object in the bottom of the hole to be washed into the central chamber 6 of the tool due to the force and velocity of the drilling fluid being forced inwardly and up into the chamber 6.

The trap 14 will yield sufficiently to receive therethrough any objects that are forced from the bottom of the hole by the force and velocity of the drilling fluid, and will prevent small objects, such as cone cutters, bolts and the like, from dropping back into the hole, but will cause these to be carried upward with the force of drilling fluid beyond the catcher 9 into the chamber 6 where such objects will drop back into the conical well portion 11 of the catcher and be retained in the chamber 6. Any small objects, such as pins, bolts or the like, which may pass through the constricted neck 17 of the trap 14, and may not pass entirely into the catcher 9, will be retained by the conical wall 16 of the trap.

The fluid will pass out through the chamber 6 and the ports 18 thereof into the well W externally of the tool and the drill stem 1, and will be forced back to the surface of the ground in the usual manner of operating rotary drilling apparatus. Any objects carried with the fluid through the chamber 6 will be deflected by the cap deflector, which will act to deflect the objects and direct them laterally and downwardly in the chamber 6, causing them to be trapped by the catcher 9 and held therein for removal from the well.

The relatively soft yieldable material of the trap 14, preferably of soft rubber or rubber-like material, enables this element to trap the objects and to retain them in the tool without danger of serious injury, breakage, yielding or damage to the trap by the objects that may pass therethrough. The shape of this trap enables it to retain the objects against falling out of the tool as it is withdrawn from the well.

It will be evident that the raising of the drill stem 1 will lift the tool from the bottom of the well, carrying with it the objects that are collected therein.

While the invention has been illustrated and described in one embodiment, it is recognized that variation and changes may be made therein without departing from the invention except as specified in the claims.

I claim:

1. A fishing tool for a well comprising a pair of bell-shaped bodies, having substantially open lower ends, said bodies being telescoped together and secured in fixed relation with respect to each other by a head having an axial opening formed therein, in such manner that the bell-shaped bodies form an annular passage between the outer diameter of said inner bell-shaped body and the inner diameter of said outer bell-shaped body, said inner bell-shaped body terminating a spaced distance above the lower end of said outer bell-shaped body, an inverted conical deflector secured to the upper inner end of said inner bell-shaped body and having the outer periphery thereof spaced from the inner wall of said inner bell-shaped body, the lower end of said outer bell-shaped body terminating in a beveled edge to insure a tight sealing relation with the bottom of said well, the lower end of said inner bell-shaped body having a catcher member attachably secured therein, which catcher member comprises a sleeve portion, a frusto-conical portion and an annular lip portion, in which catcher member an axial opening is formed thus defining an annular chamber between the outer diameter of said annular lip portion and the inner diameter of said inner bell-shaped body, a trap member of soft, rubber-like material which trap is secured to the inner diameter of said catcher member and has a peripheral sleeve portion, a frusto-conical portion, and an annular lip in which an axial opening is formed, the diameter of which opening is smaller than the diameter of said opening formed in said catcher member, said head portion having lateral passages formed therein which connect the axial opening thereof with said annular passage formed between the outer diameter of said inner bell-shaped body and the inner diameter of said outer bell-shaped body, conduits positioned above said inverted, conical deflector which conduits extend laterally from the inner diameter of said bell shaped body to the exterior of said outer bell-shaped body so as to form passages therethrough, and means for connecting said head portion with a hollow drill stem for directing hydraulic fluid through said lateral passages into said annular passage between said inner and outer bell-shaped bodies through said trap and said catcher to discharge said hydraulic fluid from the interior of said inner bell-shaped body through said conduits to the exterior of said outer bell-shaped body.

2. In a fishing tool for a well comprising a pair of bell-shaped bodies, having substantially open lower ends, said bodies being telescoped together and secured in fixed relation with respect to each other by a head having an axial opening formed therein, in such manner that said bell shaped bodies form an annular passage between the outer diameter of said inner bell-shaped body and the inner diameter of said outer bell-shaped body, said inner bell-shaped body terminating a spaced distance above the lower end of said outer bell-shaped body, a deflector secured to the upper inner end of said inner bell-shaped body and having the outer periphery thereof spaced from the inner wall of said inner bell-shaped body, the lower end of said outer bell-shaped body terminating in a beveled edge to insure a tight sealing relation with the bottom of said well, the lower end of said inner bell shaped body having a catcher member screw-threaded thereto, which catcher member comprises a frustro-conical portion in which an axial opening is formed thus defining an annular chamber between the outer diameter of said frustro-conical member and the inner diameter of said inner bell-shaped body, a trap member of soft, rubber-like material, which trap is secured to the inner diameter of said catcher member and has a frusto-conical portion in which an axial opening is formed, the diameter of which opening is smaller than the diameter of said opening formed in said catcher member, said head portion having lateral passages formed therein which connect the axial opening therewith said annular passage formed between the outer diameter of said inner bell-shaped body and the inner diameter of said outer bell-shaped body, conduits positioned above said deflector which conduits extend laterally from the inner diameter of said inner bell-shaped body to the exterior of said outer bell-shaped body so as to form passages therethrough, and means for connecting said head portion with a hollow drill stem for directing hydraulic fluid through said lateral passages into said annular passage between said inner and outer bell-shaped bodies through said trap and said catcher to discharge said hydraulic fluid from the interior of said inner bell-shaped body through said conduits to the exterior of said outer bell-shaped body.

CARROLL L. DEELY.

REFERENCES CITED

The following references are of record in the file of this patent:

UNITED STATES PATENTS

| Number | Name | Date |
| --- | --- | --- |
| 1,832,295 | Layne | June 21, 1921 |
| 2,124,772 | Flury | July 26, 1938 |
| 2,169,922 | Notley | Aug. 15, 1939 |
| 2,199,298 | White | Apr. 30, 1940 |
| 2,220,989 | Brauer | Nov. 12, 1940 |